(12) United States Patent
Beek et al.

(10) Patent No.: US 10,093,762 B2
(45) Date of Patent: Oct. 9, 2018

(54) PROCESS FOR MODIFYING POLYMERS

(71) Applicant: Akzo Nobel Chemicals International B.V., Arnhem (NL)

(72) Inventors: Waldo Joseph Elisabeth Beek, Deventer (NL); Auke Gerardus Talma, Bathmen (NL)

(73) Assignee: AKZO NOBEL CHEMICALS INTERNATIONAL B.V., Arnheim (NL)

(*) Notice: Subject to any disclaimer, the term of this patent is extended or adjusted under 35 U.S.C. 154(b) by 0 days.

(21) Appl. No.: 15/567,090

(22) PCT Filed: Apr. 21, 2016

(86) PCT No.: PCT/EP2016/058822
§ 371 (c)(1),
(2) Date: Oct. 17, 2017

(87) PCT Pub. No.: WO2016/170018
PCT Pub. Date: Oct. 27, 2016

(65) Prior Publication Data
US 2018/0155480 A1 Jun. 7, 2018

(30) Foreign Application Priority Data
Apr. 24, 2015 (EP) .................................... 15165044

(51) Int. Cl.
| | | |
|---|---|---|
| *C08J 3/24* | (2006.01) | |
| *C08K 5/28* | (2006.01) | |
| *C08K 5/3415* | (2006.01) | |
| *C08L 23/36* | (2006.01) | |
| *C08L 51/04* | (2006.01) | |
| *C08F 255/04* | (2006.01) | |
| *C08F 255/10* | (2006.01) | |
| *C08F 8/48* | (2006.01) | |
| *C08F 222/40* | (2006.01) | |
| *C08F 255/06* | (2006.01) | |
| *C08L 23/06* | (2006.01) | |
| *C08L 23/12* | (2006.01) | |
| *C08L 23/16* | (2006.01) | |

(52) U.S. Cl.
CPC .............. *C08F 255/04* (2013.01); *C08F 8/48* (2013.01); *C08F 222/40* (2013.01); *C08F 255/06* (2013.01); *C08F 255/10* (2013.01); *C08J 3/24* (2013.01); *C08L 23/06* (2013.01); *C08L 23/12* (2013.01); *C08L 23/16* (2013.01); *C08F 2222/402* (2013.01); *C08F 2222/408* (2013.01); *C08F 2810/40* (2013.01); *C08J 2300/26* (2013.01); *C08J 2307/00* (2013.01); *C08J 2323/06* (2013.01); *C08J 2323/12* (2013.01); *C08J 2323/16* (2013.01); *C08J 2323/36* (2013.01); *C08J 2325/06* (2013.01); *C08J 2325/10* (2013.01); *C08J 2331/04* (2013.01); *C08J 2351/04* (2013.01); *C08L 2312/00* (2013.01)

(58) Field of Classification Search
CPC ........ C08F 255/04; C08F 255/10; C08F 8/48; C08J 3/24; C08J 2300/26; C08J 2307/00; C08J 2323/36; C08J 2325/06; C08J 2325/10; C08J 2331/04; C08L 2312/00
See application file for complete search history.

(56) References Cited

U.S. PATENT DOCUMENTS

| | | | |
|---|---|---|---|
| 3,205,206 A | 9/1965 | Marcantonio et al. | |
| 3,250,731 A | 5/1966 | Buhl et al. | |
| 3,631,182 A | 12/1971 | Breslow | |
| 4,287,294 A | 9/1981 | Rubner et al. | |
| 4,329,556 A | 5/1982 | Rubner et al. | |
| 4,352,938 A | 10/1982 | Breslow | |
| 5,844,049 A | 12/1998 | Datta et al. | |
| 5,883,145 A | 3/1999 | Hurley et al. | |
| 6,313,314 B1 | 11/2001 | Cheng et al. | |
| 9,683,057 B2 | 6/2017 | Beek et al. | |
| 9,688,783 B2 | 6/2017 | Beek et al. | |
| 2003/0044468 A1 | 3/2003 | Cellesi et al. | |
| 2006/0222765 A1 | 10/2006 | Stappers | |
| 2009/0275703 A1 | 11/2009 | Alvarez Grima et al. | |
| 2016/0280805 A1 | 9/2016 | Beek et al. | |

FOREIGN PATENT DOCUMENTS

| | | |
|---|---|---|
| EP | 0 019 122 A2 | 11/1980 |
| EP | 0 019 726 A1 | 12/1980 |
| EP | 0 143 380 A2 | 6/1985 |
| JP | 4372662 B2 | 11/2009 |

(Continued)

OTHER PUBLICATIONS

JEFFAMINE® polyetheramine product information sheet Huntsman Corporation downloaded from www.huntsman.com on Apr. 5, 2018.*
European Search Report issued in the counterpart European Application No. 15165044.7 dated Oct. 1, 2015.
Notification of Transmittal of the International Search Report and the Written Opinion of the International Searching Authority, or the Declaration from the International Bureau of WIPO for International Application No. PCT/EP2016/058822 dated Jul. 26, 2016.
Bateman et al., "Sulfonyl Azides—An Alternative Route to Polyolefin Modification," Journal of Applied Polymer Science, vol. 84, (2002), pp. 1395-1402, XP-002719995.
Arslan et al., "Clickable Poly(ethylene glycol)-Based Copolymers Using Azide-Alkyne Click Cycloaddition-Mediated Step-Growth Polymerization," Macromolecular Chemistry and Physics, vol. 215, No. 22, Jun. 25, 2014, pp. 2237-2247, XP055215106.

(Continued)

Primary Examiner — Irina S Zemel
Assistant Examiner — Jeffrey S Lenihan
(74) Attorney, Agent, or Firm — Matthew D. Kellam

(57) ABSTRACT

Process for modifying a polymer comprising the steps of (a) mixing the polymer with a maleimide-functionalized mono-azide and/or a citraconimide-functionalized mono-azide at a temperature in the range 80-250° C. to form a functionalized polymer, and (b) reacting the functionalized polymer with a substance containing one or more functional groups that can react with a maleimide or citraconimide functional group.

16 Claims, No Drawings

(56) References Cited

FOREIGN PATENT DOCUMENTS

| WO | 2008/130894 A1 | 10/2008 |
|---|---|---|
| WO | 2012/116250 A1 | 8/2012 |
| WO | 2015/067531 A1 | 5/2015 |
| WO | 2015/067533 A1 | 5/2015 |
| WO | 2016/170019 A1 | 10/2016 |
| WO | 2016/170020 A1 | 10/2016 |

OTHER PUBLICATIONS

Decker et al. "Photocrosslinking of a maleimide functionalized polymethacrylate," Polymer International, vol. 52, No. 5, Apr. 22, 2003 (Apr. 22, 2003), pp. 722-732, XP055215059.

Hall et al, "Synthesis and post-polymerization modification of maleimide-containing polymers by 'thiol-ene' click and Diels-Alder chemistries," Polymer International, vol. 60, No. 8, Jun. 28, 2011 (Jun. 28, 2011), pp. 1149-1157, XP055215363.

Anon, Research Disclosure (1999), 427 (Nov.), P-1472 (No. 427060).

"NHS/Nitrophenyl Azide Croslinkers" Dec. 24, 2005 (Dec. 24, 2005), pp. 1-3, Retrieved from: URL:https://www.funakoshi.co.jp/data/datasheet/PCC/22589.pdf [retrieved on Sep. 24, 2015], * p. 1 * XP055215882.

Mark et al., The Science and Technology of Rubber, 3rd edition, 2005, pp. 388-391.

Bouhelal et al, "Structure Modification of Isotactic Polypropylene through Chemical Crosslinking: Toughening Mechanism," Journal of Applied Polymer Science, vol. 103, No. 5, 1 (2006), pp. 2968-2976, * XP055216400.

A.J. Zielinska, Cross-Linking and Modification of Saturated Elastomers Using Functionalized Azides, Dissertation, University of Twente, Jul. 1, 2011 (1 of 2, cover page to p. 78).

A.J. Zielinska, Cross-Linking and Modification of Saturated Elastomers using Functionalized Azides, Dissertation, University of Twente, Jul. 1, 2011 (2 of 2, pp. 79-165).

Passaglia et al., "Effect of Structure of Functionalizing Molecules on the Inter-Macromolecular Reactions and Blending of Poly(ethylene-co-propylene) (EPM) With Poly (6-aminohexanoic Acid) (PA6)", Helvetica Chimica ACTA, vol. 89, No. 8, Aug. 30, 2006, pp. 1596-1609, XP-002720059.

J.K. Jorgensen et al., "Introduction of Long-Chain Branches in Linear Polyethylene by Light Crosslinking with 1,3-Benzenedisulfonyl Azide," Polymer, 46, (2005), pp. 12256-12266.

\* cited by examiner

PROCESS FOR MODIFYING POLYMERS

This application is a national stage filing under 35 U.S.C. § 371 of PCT/EP2016/058822, filed Apr. 21, 2016, which claims priority to European Patent Application No. 15165044.7, filed Apr. 24, 2015, the contents of each of which are each incorporated herein by reference in their entirety.

The present invention relates to a process for modifying polymers using (cyclo)addition chemistry.

Elastomers are conventionally crosslinked by using elemental sulfur combined with several sulfur vulcanization accelerators. Crosslinking with peroxides, however, gains more territory the last couple of years. Advantages of peroxide crosslinking are the better reversion resistance, better heat and chemical resistance and better compression set compared to sulfur-crosslinked systems.

Sulfur-based cure systems are generally not utilized for polyolefins because of the absence of unsaturations. In addition, discoloration by additives and the smell of sulfur components are highly undesirable in polyolefin applications.

Polyethylene is commonly cured with peroxides. Polypropylene, however, is known to degrade upon peroxide treatment. Peroxides are used to enhance the melt strength of polypropylene by creating long chain branches.

Sulfur- and peroxide based crosslinking both lead to the evolution of organic volatiles; during the crosslinking process and also from the final crosslinked article. It can be imagined that evolution of volatiles from crosslinked elastomers in building and construction materials (e.g. window and door profiles) is undesirable. In addition, the components of the cure systems, i.e. sulfur, accelerators, peroxides, and/or decomposition products thereof, often tend to migrate to the surface of the treated polymer article (this is called blooming or staining), which can cause undesirable contact contamination to skin or other surfaces.

It would therefore be desirable to provide a process for polymer crosslinking which can be performed without the release of organic volatiles and blooming/staining.

This object is achieved by the process according to the present invention, which makes use of addition chemistry and can be conducted such that nitrogen is the only volatile formed.

The process involves the introduction of maleimide and/or citraconimide groups on the polymer backbone. During this functionalization, nitrogen is released. The second step of the process involves the reaction between said maleimide and/or citraconimide groups with a substance containing one or more functional groups that can react with a maleimide or citraconimide group.

This second step preferably involves a Michael addition or a Diels-Alder cycloaddition reaction. If said substance contains only one functional group that can react with a maleimide or citraconimide functional group, the polymer is modified with additional functionalities; if the substance contains two or more functional groups that can react with a maleimide or citraconimide functional group, crosslinking will occur. The resulting crosslinks are potentially reversible (retro-Diels-Alder and retro-Michael additions), which makes the so-crosslinked polymers recyclable.

The process according to the present invention relates to a process for modifying a polymer comprising the steps of:
a. mixing said polymer with a maleimide-functionalized mono-azide and/or a citraconimide-functionalized mono-azide at a temperature in the range 80-250° C. to form a functionalized polymer, and
b. reacting the functionalized polymer with a substance containing one or more functional groups that can react with a maleimide or citraconimide functional group.

In a preferred embodiment, the substance used in step b) contains at least two functional groups that can react with a maleimide or citraconimide functional group, which results in crosslinking of the polymer.

The present invention therefore also relates to a process for crosslinking a polymer comprising the steps of:
a. mixing said polymer with a maleimide-functionalized mono-azide and/or a citraconimide-functionalized mono-azide at a temperature in the range 80-250° C. to form a functionalized polymer, and
b. reacting the functionalized polymer with a substance containing at least two functional groups that can react with a maleimide or citraconimide functional group.

The term 'polymer' in the present application includes polymers and oligomers. That is, it includes materials made up from at least 2, preferably at least 5, and most preferably at least 10 monomeric units.

Polymers that can be suitably modified and/or crosslinked by this method include elastomers, chain saturated polymers, polyesters, and blends of one or more of these polymers.

Examples of elastomers are natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), and ethylene vinylacetate copolymer (EVA).

Chain saturated polymers include polyolefins. Suitable polyolefins are polyethylene (LDPE, LLDPE, HDPE) and polypropylene (PP), both the homopolymers and co-polymers thereof. Examples of such co-polymers are polyolefin elastomers (POE), which are based on polyethylene-octene or butane copolymers.

Examples of polyesters are polylactic acid (i.e. polylactide, PLA) and poly(hydroxyalkanoates like poly(hydroxybutyrate), poly(butylene succinate), polyglycolide, and poly(ε-caprolactone).

Examples of polymer blends are thermoplastic polyolefin (TPO) blends, thermoplastic elastomer (TPE) blends, and TPV (EPDM/polypropylene) blends.

Maleimide-functionalized monoazides that can be used in the process of the present invention preferably have the formula:

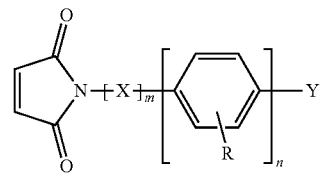

wherein Y is

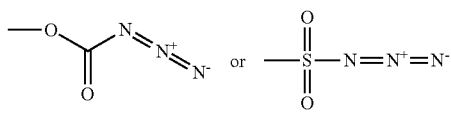

m is 0 or 1, n is 0 or 1, n+m=1 or 2, preferably 1,
R is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and X is a linear or branched, aliphatic or aromatic hydrocarbon moiety with 1-12 carbon atoms, optionally containing heteroatoms.

Citraconimide-functionalized monoazides that can be used in the process of the present invention preferably have the formula:

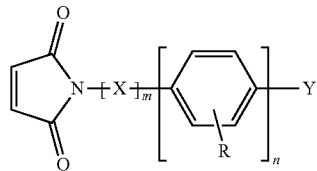

wherein Y is either

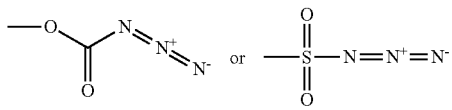

m is 0 or 1, n is 0 or 1, n+m=1 or 2, preferably 1, R is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and X is a linear or branched, aliphatic or aromatic hydrocarbon moiety with 1-12 carbon atoms, optionally containing heteroatoms.

In the above formulae, R is preferably hydrogen.

When X in the above formulae contains heteroatoms, it preferably has one of the following structures:

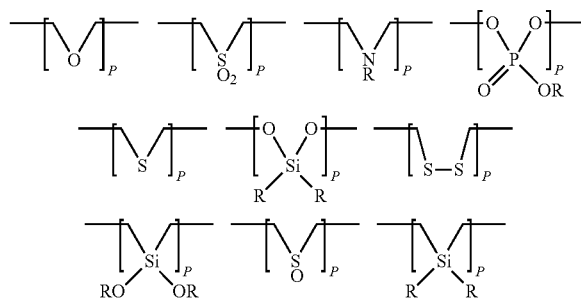

wherein P is an integer ranging from 1 to 6 and R is selected from the group consisting of H, alkyl, aryl, phenyl, and substituted phenyl groups.

More preferably, however, X is an aliphatic alkanediyl group with 1-12, more preferably 1-6, and most preferably 2-4 carbon atoms.

A particularly preferred maleimide-functional monoazide is 4-(2,5-dioxo-2,5-dihydro-1H-pyrrol-1-yl)benzenesulfonyl azide:

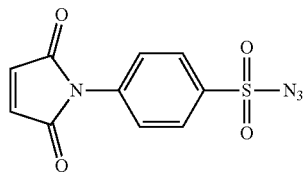

Particularly preferred citraconimide-functional monoazides are

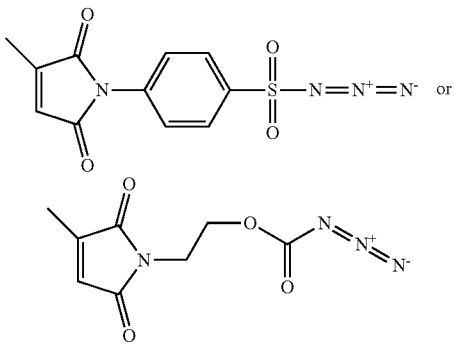

i.e. 4-(3-methyl-2,5-dioxo-2,5-dihydro-1H-pyrrol-1-yl) benzenesulfonyl azide (also called citraconimide benzenesulfonylazide) and 2-(3-methyl-2,5-dioxo-2,5-dihydro-1H-pyrrol-1-yl)ethyl carbonazidate (also called citraconimide-C2-azidoformate), respectively.

Functionalization step a) can be performed in any suitable equipment capable of mixing polymers at a temperature in the range 80-250° C. Examples of such equipment are internal batch mixers (often called Banbury mixers), two-roll-mills (provided the rolls can be heated), extruders, and the like. The result of the functionalization is a polymer containing maleimide and/or citraconimide functionalities.

The functionalized azide is preferably mixed with the polymer in an amount of 0.01-20 phr, more preferably 0.05-10 phr, and most preferably 0.1-5 phr. The term "phr" means: weight parts per hundred weight parts of polymer.

In addition to the polymer and the functionalized azide, radical scavengers and antioxidants may be added to the mixture. Examples of radical scavengers are t-butyl hydroquinone (TBHQ), 2,2,6,6-tetramethylpiperidinooxy (TEMPO), and 4-hydroxy-2,2,6,6-tetramethylpiperidin-1-oxyl (OH-TEMPO). Examples of suitable antioxidants are sterically hindered polynuclear phenols (e.g. Vulkanox® SKF, Vulkanox® DS, Vulkanox BKF, Irganox 1010), aminic antioxidants (e.g. Flectol TMQ), diphenyl diamin based antioxidants (e.g. Santonox 6PPD), and phosphites (e.g. Weston TNPP)

The functionalization is performed at a temperature in the range 80-250° C., preferably 90-230° C., more preferably 100-200° C., and most preferably 110-180° C. The temperature of choice depends on the type of polymer and the type of azide. During this functionalization reaction, $N_2$ is formed.

Sulfonyl azides (azidosulfonates) typically start to decompose into reactive nitrene species around 130° C. with a peak around 180° C.; azidoformates start to decompose above 110° C. with a peak at 160° C. The formed nitrene moieties react with the polymer, resulting in grafting of the nitrene onto the polymer.

One additional mechanism in which azides can react with unsaturated polymers is via the so-called "click" mechanism, which can occur below the decomposition temperature of the azide. On fully saturated polymers this "click" mechanism will not occur.

The preferred reaction time is 1-120 minutes, more preferably 1-60 minutes, and most preferably 2-30 minutes.

The functionalized polymer is reacted with a substance containing one or more functional groups that can react with a maleimide or citraconimide functional group. This reaction may be a Michael addition reaction or a Diels-Alder cycloaddition reaction. In a preferred embodiment, the substance is added to the functionalized polymer after functionalization step a). However, when the reaction occurs according to a Diels-Alder cycloaddition mechanism, the substance can also be added to the polymer before or during functionalization step a).

The functional group(s) is/are preferably selected from amine, thiol, furan, and sorbate ester groups. Amines and thiols react with the maleimide and citraconimide functionalities via Michael addition; furans and sorbate ester groups react via a Diels Alder cycloaddition.

Examples of substances that contain only one functional group that can react with a maleimide or citraconimide functional group and which can suitably be used to modify the properties of the polymer—for instance for improving the interaction with polar fillers—are aminoalcohols, aminoacids, polyether monoamines (Jeffamines), furans, aminofunctional silanes, mercaptoacids, and mercaptoalcohols.

Examples of aminoalcohols are aminoalcohols with primary amine groups, such as ethanolamine, propanolamine, butanolamine, etc.

Examples of furans are furfurylalcohol, furfuryl methacrylate, furfuryl glycidyl ether, and furfuryl isocyanate.

Examples of aminofunctional silanes are (3-aminopropyldiisopropylethoxysilane, 3-aminopropyldimethylethoxysilane, N-(2-aminoethyl)-3-aminopropyl trimethoxysilane, N-(2-aminoethyl)-3-aminopropyl triethoxysilane, N-(6-aminohexyl) aminomethyl triethoxysilane, N-(6-aminohexyl) aminopropyl trimethoxysilane, N-(2-aminoethyl)-11-aminoudecyl trimethoxysilane, (aminoethylaminomethyl)-phenylethyl trimethoxysilane, N-(2-aminoethyl)-3-aminopropyl methyldimethoxysilane. N-(2-aminoethyl)-3-aminoisobutyl methyldimethoxysilane, (aminoethylamino)-3-isobutyldimethylmethoxysilane, and (3-trimethoxysilylpropyl)-diethylenetriamine).

Examples of thiols are 3-mercaptopropionic acid, 1-mercapto-2-propanol, 3-mercapto-1-propanol, 4-mercapto-1-butanol, 6-mercaptohexanoic acid, 6-mercapto-1-hexanol, 6-mercapto-1-hexanol, 8-mercaptooctanoic acid, 8-mercapto-1-octanol, 9-mercapto-1-nonanol, 11-mercaptoundecanoic acid, 11-mercaptoundecanoic acid, 11-mercaptoundecanamide, 11-azido-1-undecanethiol, 11-mercapto-1-undecanol, 11-mercapto-1-undecanol, 11-mercaptoundecylphosphonic acid, 11-mercaptoundecylphosphoric acid, 12-mercaptododecanoic acid, 12-mercaptododecanoic acid, 11-(1H-pyrrol-1-yl)undecane-1-thiol, 12-mercaptododecanoic acid NHS ester, 16-mercaptohexadecanoic acid, 16-mercaptohexadecanoic acid, triethylene glycol mono-11-mercaptoundecyl ether, (11-mercaptoundecyl)tetra(ethylene glycol), and, (11-mercaptoundecyl)hexa(ethylene glycol).

Preferred thiols are 3-mercaptopropionic acid, 1-mercapto-2-propanol, 3-mercapto-1-propanol, 4-mercapto-1-butanol, 6-mercaptohexanoic acid, and 6-mercapto-1-hexanol.

Examples of fillers of which the interaction with the polymer could be improved as a result of this process are carbon black, silica, silicates, mica, aluminium oxides, hydroxides like magnesium hydroxides and aluminium hydroxides, carbonates like calcium carbonate, clays, nanoclays, sulfates like bariumsulfate, and natural organic fillers with polar character like wood or lignin fibres, cellulose fibres, and hemp.

If the substance contains two or more functional groups that can react with a maleimide or citraconimide functional group, these two or more functional groups are preferably selected from amine, thiol, furan, and sorbate ester groups. The at least two functional groups can be the same or different.

Examples of substances with at least two thiol groups include substances having three mercapto groups such as 1,2,6-hexanetriol trithioglycolate, 1,3,5-trithiocyanuric acid, trimethylolpropane tris(3-mercaptopropionate), or trimethylolpropane trithioglycolate, and substances having four or more mercapto groups such as pentaerythritol tetrakis(3-mercaptopropionate), pentaerythritol tetrakisthioglycolate, pentaerythritol hexakis(3-mercaptopropionate), or pentaerythritol hexakisthioglycolate.

Examples of substances with at least two amine groups include bis(hexamethylene)triamine, 1,6-diaminohexane, isophorone diamine, tris(2-aminoethyl)amine, 4-aminophenylether, 1,2-diamino butane, 1,4-diamino butane, 1,5-diamino pentane, 1,5-diamino(2 methyl)pentane, 1,7-diamino heptane, 1,8-diamino octane, 1,9-diamino nonane, 1,10-diamino decane, 1,12-diamino dodecane, 1,6-diamino-(2,2,3-trimethyl)hexane, tricyclododecane diamine, m-xylylene diamine, (ortho-, meta- and para) diamino benzene(phenylene diamine), 2,2'-Dithiobis(ethylamine), dianiline methane, dianiline ether, dianiline sulphone, 2,2',6,6'-tetraethyl dianiline methane, 2,2',6,6'-tetramethyldianiline methane, 2,2'-dimethyl-6,6'-diethyldianiline methane, 2,2',6,6'-tetraisopropyl dianiline methane, 2,2'-diisopropyl-6,6'-dimethyl dianiline methane, 1,8-diamino-menthane, 4-aminomethyl-1,8-octane diamine, N-phenyl-1,4-phenylene diamine, 4,4' dianilino diphenylamine, 1,8-diamino-3,6-dioxaoctane, 1,5-diamino-3-oxapentane, α,ω-poly tetrahydrofuryl diamines, α,ω-polyglycol diamines (Jeffamine®), α,ω-polypropoxy diamines (Jeffamines®), α,ω-polyethoxy-propoxy diamines, 3,5-diamino benzoic acid, 3,4-diamino benzophenone, 1,2-diamino cyclohexane, diamino naphthalene and diamino toluene.

Preferred polyfunctional amines are bis(hexamethylene) triamine, 1,6-diaminohexane, isophorone diamine, tris(2-aminoethyl)amine, and 4-aminophenylether.

Examples of substances with an amine and a thiol group include 3-amino-1-propanethiol hydrochloride, 6-amino-1-hexanethiol hydrochloride, 8-amino-1-octanethiol hydrochloride, 11-amino-1-undecanethiol hydrochloride, and 16-amino-1-hexadecanethiol hydrochloride.

Examples of substances with two or more functional groups that react with maleimide and citraconimide groups via Diels-Alder cycloaddition include 2,2-di(2-furyl)propane, thiodimethylenedifuran and ethane-1,2-diyl (2E,2'E, 4E,4'E)-bis(hexa-2,4-dienoate).

Examples of substances that can react via Diels-Alder cycloaddition on one side and via Michael addition on the other side of the molecule are furfuryl amine and furfuryl mercaptan.

The substance containing one or more functional groups that can react with a maleimide or citraconimide functional group is preferably added to the functionalized polymer in a molar equivalent ratio of 0.1-3.0, more preferably 0.2-2.0, and most preferably 0.5-1.5. The term "molar equivalent ratio" refers to the total number of functional groups that can react with a maleimide or citraconimide functional group relative to the total number of maleimide and citraconimide groups.

The substance containing one or more functional groups that can react with a maleimide or citraconimide functional group can be mixed into the functionalized polymer using, for example, a two roll mill or an extruder. The mixing can be performed at room temperature or at any other temperature that allows mixing without premature crosslinking. A preferred temperature range is 20-40° C.

A catalyst can be added in order to speed up the addition reaction, although this is not required. The addition of a base catalyst is preferred if the substance contains thiol functional groups. Examples of suitable catalysts include 1,4-diazabicyclo[2.2.2]octane (DABCO), triethylamine, quinuclidinol, triphenylphosphine, and hydroxides.

If the substance containing one or more functional groups that can react with a maleimide or citraconimide functional group contains aliphatic amine functional groups, no catalyst is required; whereas if the substance contains aromatic amine functional groups, an acid catalyst, e.g. acetic acid, may be added.

Diels-Alder cycloaddition does not require any catalyst. The optional catalyst can be added to the functionalized polymer in a concentration of 0.01-2.0 wt %, more preferably 0.02-1.0 wt % and most preferably 0.05-0.50 wt %, based on the weight of functionalized polymer.

The resulting mixture can be shaped in a desired form. This shaping can be performed in a mould (compression, injection or transfer moulding), an extruder (where shaping dies can be installed at the extruder head), or a calender (to process a polymer melt into a sheet or thin film). Also a so-called thermoforming process can be used to form shapes from foils or sheets of polyolefins.

The shaped mixture can be subsequently thermally treated at a temperature in the range 40-250° C., preferably 45-200° C., and most preferably 50-190° C. in order to allow a crosslinking reaction to occur.

The crosslinked polymers obtainable by the process of the present invention can be used in many applications as alternative for polymers crosslinked with sulfur cure accelerators or peroxides, including building and construction material (window and door profiles), wire- and cable applications, tyres (side walls, treads), (conveyer) belts, bladders, hoses, tubes, seals, gloves, dock fenders, footware, flooring, and escalator handrails.

EXAMPLES

Example 1

An ethylene-propylene copolymer (EPM, Vistalon™ 404 ex Exxon Mobil), without unsaturations, was functionalized with citraconimide benzenesulfonylazide. To achieve this, 47 grams of EPM were mixed with 0.93 grams of citraconimide benzenesulfonylazide and heat treated at 150-180° C. for 20 minutes in a Banbury type internal mixer to allow grafting of the azide onto the EPM.

To the resulting functionalized EPM were added pentaerythritol tetrakis(3-mercaptopropionate) and 0.1 wt % of the catalyst DABCO (1,4 diazabicyclo[2.2.2]octane, also called triethylene diamine) and the substances were mixed on a two roll mill at a temperature between 20-40° C. The amount of pentaerythritol tetrakis(3-mercaptopropionate) added corresponded to 1.1 wt % based on the total mixture and a molar ratio of citraconimide functionalities to tetrathiol of 3:1

The cure speed and crosslink performance were tested by curing samples at 170° C. for 30 minutes using an Alpha Technologies MDR2000 Rheometer. The results were analyzed according to ISO 6502-1991 (Measurement of vulcanization characteristics with rotorless curemeters).

The cure time (t90; the time required to achieve 90% of the ultimate maximum crosslink density) was 15 minutes. Delta torque (ΔS), which is an indication of the ultimate crosslink density, was 0.23 Nm.

Example 2

Example 1 was repeated, except that:
maleimide benzenesulfonyl azide was used instead of citraconimide benzenesulfonyl azide,
0.2 wt % DABCO was used,
either no or 0.8 wt % of pentaerythritol tetrakis(3-mercaptopropionate) was used (resulting in a molar ratio of maleimide functionalities to tetrathiol of about 4:1), and
the polymer was crosslinked at 180° C. instead of 170° C.
The results are listed in Table 1.

TABLE 1

| Ex | Maleimide functionality [%] | Tetrathiol concentration [%] | Rheometer cure (ΔS) [Nm] | Cure time* (t90) [min] |
|---|---|---|---|---|
| 2A | 2 | 0 | 0.04 | — |
| 2B | 2 | 0.8 | 0.19 | 10 |

Table 2 lists the crosslink performance of the modified EPM with the indicated amounts of crosslinker (tetrathiol). Listed are t90, i.e. the times required for obtaining 90% of the ultimate maximal crosslink density, and delta torque ΔS measured in a rheometer. The experiments clearly show that the tetrathiol is required for the crosslinking reaction to occur.

Example 3

An ethylene-propylene diene terpolymer (EPDM, Keltan 5470C ex Lanxess Elastomers), was functionalized with a maleimide benzenesulfonylazide. To achieve this, 50 grams of EPDM were mixed with 1 gram of maleimide benzenesulfonylazide and 1 gram of Vulkanox® SKF (a stabilizer to prevent gel formation, thereby improving processability) and heat treated at 120-170° C. for 25 minutes in a Banbury type internal mixer to allow grafting of the azide onto the EPDM.

After functionalization, 1 equivalent of thiodimethylenedifuran was added to the modified EPDM using a two roll mill at 20-40° C. The molar ratio of the maleimide functionalities to the bisfuran crosslinker was 2:1.

Crosslinking was performed by heating the resulting mixture at 150° C. for 5 minutes and continuing the heating for a further 24 hours at 50° C. This allowed the Diels-Alder crosslink reaction to take place.

Table 2 shows the recipe (entry 3A) for functionalization and crosslinking the functionalized EPDM with the bisfuran.

Examples 3B-3D are comparative examples, showing the crosslink density of the starting EPDM (3B) and EPDM crosslinked with different amounts of dicumyl peroxide (3C and 3D). Samples 3C and 3D were crosslinked by heating to 170° C. for 30 minutes to allow full decomposition of the peroxide into effective radicals.

The crosslink density (ϑ) was measured using an equilibrium swelling method in toluene and the Flory-Rehner relationship between the crosslink density (ϑ) and the experimentally determined volume fraction rubber in the swollen sample (φ). A Flory-Huggins interaction parameter of 0.429+0.218φ for the combination of EPDM and toluene was used.

The results in Table 2 indicate that EPDM itself shows no crosslink density, whereas EPDM crosslinked utilizing the Diels-Alder crosslink system according to the present invention has a crosslink density comparable to EPDM crosslinked with 0.2-0.4 phr of a peroxide (dicumyl peroxide).

TABLE 2

|  | 3A | 3B | 3C | 3D |
|---|---|---|---|---|
| EPDM Keltan 5470C | 100 | 100 | 100 | 100 |
| Vulkanox SKF [g] | 1 |  |  |  |
| Maleisulfonylazide [g] | 1 |  |  |  |
| Thiodimethylenedifuran [g] | 0.38 |  |  |  |
| dicumyl peroxide [g] |  |  | 0.2 | 0.4 |
| Crosslink density, swelling method (ϑ) [mol/cm³] | 5.0E−5 | 0* | 3.6E−5 | 9.7E−5 |

*The uncrosslinked EPDM completely dissolved in toluene.

Example 4

A butyl rubber (BR, Rubber Neocis® BR40) was functionalized with citraconimide benzenesulfonylazide. To achieve this, 47 grams of BR were mixed with 0.94 grams of citraconimide benzenesulfonylazide and heat treated at 150-180° C. for 20 minutes in a Banbury type internal mixer to allow grafting of the azide onto the BR.

To the resulting functionalized BR was added 0.24 gram of ethanolamine and the substances were mixed on a two roll mill at a temperature between 20-40° C. The molar ratio of citraconimide functionalities to ethanolamine was about 1:1

In $^1$H-NMR spectra (with $CDCl_3$ as solvent), free ethanolamine gives signals at 2.8 and 3.6 ppm. After the above treatment, these signals moved to 3.1 and 3.7 ppm, respectively. 1D-DOSY NMR showed that these signals at 3.1 and 3.7 ppm belong to a high molecular weight fraction, which proves that the ethanolamine is linked to the butyl rubber.

The invention claimed is:

1. Process for modifying a polymer comprising the steps of
   a) mixing said polymer with a maleimide-functionalized mono-azide and/or a citraconimide-functionalized mono-azide at a temperature in the range 80-250° C. to form a functionalized polymer, and
   b) reacting the functionalized polymer with a substance containing one or more functional groups that can react with a maleimide or citraconimide functional group.

2. Process according to claim 1 wherein said substance contains at least two functional groups that can react with a maleimide or citraconimide functional group.

3. Process according to claim 1 wherein the reaction between the functionalized polymer with the substance containing one or more functional groups that can react with a maleimide or citraconimide functional group involves a Michael addition reaction or a Diels-Alder cycloaddition reaction.

4. Process according to claim 1 wherein the one or more functional groups are selected from the group consisting of amine, thiol, furan, and sorbate ester groups.

5. Process according to claim 2 wherein the substance containing at least two functional groups that can react with a maleimide or citraconimide functional group is selected from the group consisting of aminoalcohols, aminoacids, polyether monoamines, furans, aminofunctional silanes, mercaptoacids, and mercaptoalcohols.

6. Process according to claim 2 wherein the substance containing at least two functional groups that can react with a maleimide or citraconimide functional group is selected from the group consisting of 1,2,6-hexanetriol trithioglycolate, 1,3,5-trithiocyanuric acid, trimethylolpropane tris(3-mercaptopropionate), trimethylolpropane trithioglycolate, pentaerythritol tetrakis(3-mercaptopropionate), pentaerythritol tetrakisthioglycolate, pentaerythritol hexakis(3-mercaptopropionate), and pentaerythritol hexakisthioglycolate.

7. Process according to claim 2 wherein the substance containing at least two functional groups that can react with a maleimide or citraconimide functional group is selected from the group consisting of bis(hexamethylene)triamine, 1,6-diaminohexane, isophorone diamine, tris(2-aminoethyl)amine, 4-aminophenylether, bis(hexamethylene)triamine, and tris(2-aminoethyl)amine.

8. Process according to claim 2 wherein the substance containing at least two functional groups that can react with a maleimide or citraconimide functional group is selected from the group consisting of 2,2-di(2-furyl)propane, difurfurylsulfide, 2,2-di(2-furyl)propane, thiodimethylenedifuran, and ethane-1,2-diyl (2E,2'E,4E,4'E)-bis(hexa-2,4-dienoate).

9. Process according to claim 2 wherein the substance containing at least two functional groups that can react with a maleimide or citraconimide functional group is selected from the group consisting of pentaerythritol tetrakis(3-mercaptopropionate), bis(hexamethylene)triamine, tris(2-aminoethyl)amine, 2,2-di(2-furyl)propane, and difurfurylsulfide.

10. Process according to claim 1 wherein the polymer is an elastomer.

11. Process according to claim 10 wherein the elastomer is selected from the group consisting of natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), and ethylene vinylacetate copolymer (EVA).

12. Process according to claim 1 wherein the polymer is a polyolefin.

13. Process according to claim 12 wherein the polyolefin is selected from the group consisting of polyethylene, polypropylene, and polyolefin elastomers.

14. Process according to claim 1 wherein the maleimide-functionalized azide has the following structure:

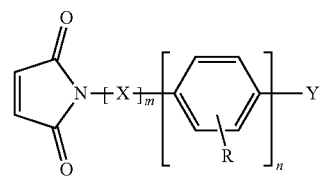

wherein Y is

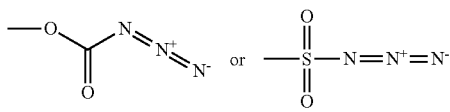

m is 0 or 1, n is 0 or 1, n+m=1 or 2, R is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and X is a linear or branched, aliphatic or aromatic hydrocarbon moiety with 1-12 carbon atoms, optionally containing heteroatoms.

15. Process according to claim 1 wherein the citraconimide-functionalized azide has the following structure:

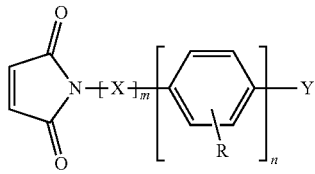

wherein Y is either

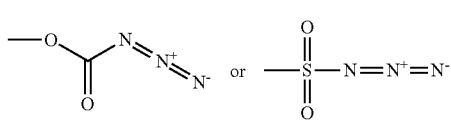

m is 0 or 1, n is 0 or 1, n+m=1 or 2, R is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and X is a linear or branched, aliphatic or aromatic hydrocarbon moiety with 1-12 carbon atoms, optionally containing heteroatoms.

16. Process according to claim 1 wherein the mono-azide is selected from the group consisting of 4-(2,5-dioxo-2,5-dihydro-1H-pyrrol-1-yl)benzenesulfonyl azide, 4-(3-methyl-2,5-dioxo-2,5-dihydro-1H-pyrrol-1-yl)benzene sulfonyl azide, and 2-(3-methyl-2,5-dioxo-2,5-dihydro-1H-pyrrol-1-yl)ethyl carbonazidate.

\* \* \* \* \*